United States Patent [19]

Furushima et al.

[11] Patent Number: 4,796,671
[45] Date of Patent: Jan. 10, 1989

[54] PROTECTIVE TUBE FOR THERMOCOUPLE AND METHOD OF PRODUCING SAME

[75] Inventors: Kiyoshi Furushima; Kazunori Haratoh; Hideshige Matsuo, all of Kitakyushu, Japan

[73] Assignee: Hitachi Metals, Ltd., Japan

[21] Appl. No.: 26,751

[22] Filed: Mar. 17, 1987

[30] Foreign Application Priority Data

Mar. 18, 1986 [JP] Japan ................... 61-58325

[51] Int. Cl.$^4$ ............................. H01L 35/02
[52] U.S. Cl. ....................... 138/140; 374/139; 374/208; 428/34.6; 501/97
[58] Field of Search ............ 374/179, 139, 208; 428/36; 138/140

[56] References Cited

U.S. PATENT DOCUMENTS

| | | | |
|---|---|---|---|
| 4,430,518 | 2/1984 | Nakajima et al. | 374/139 |
| 4,547,470 | 10/1985 | Tanase et al. | 501/98 X |
| 4,558,018 | 12/1985 | Matsuhiro et al. | 501/98 X |
| 4,568,516 | 2/1986 | Alderborn et al. | 419/26 |
| 4,699,890 | 10/1987 | Matsui | 501/98 |

FOREIGN PATENT DOCUMENTS 3148993 6/1983 Fed. Rep. of Germany.

OTHER PUBLICATIONS

F. Lieneweg, "Handbuch der technischen Temperaturmessung", 1976, Verlag Vieweg, p. 199.
L. V. Kortvelyessy, "Thermoelement Praxis", Vulkan-Verlag, 1981, p. 211.

*Primary Examiner*—Stephen Marcus
*Attorney, Agent, or Firm*—Finnegan, Henderson, Farabow, Garrett & Dunner

[57] ABSTRACT

A protective tube for a thermocouple for measuring the temperature of molten metal, comprising two layers, an inner layer being made of a silicon nitride or sialon ceramic having a bending strength of 50 kg/mm$^2$ or more, a density of 90% or more based on a theoretical density and a thermal shock temperature $\Delta T$ of 400° C. or more, and an outer layer being formed on the silicon nitride or sialon ceramic and containing BN and SiO$_2$. The silicon nitride of sialon ceramic comprises 70 weight % or more of Si$_3$N$_4$ having 65 weight % or more of an α-phase content, 20 weight % or less of one or more oxides of elements of Group IIIa of the Periodic Table, 20 weight % or less of Al$_2$O$_3$, and optionally 15 weight % or less of AlN or AlN solid solution, and the outer layer is composed mainly of BN-SiO$_2$-Al$_2$O$_3$-Y$_2$O$_3$. This protective tube is produced by coating ceramic powder comprising BN and SiO$_2$ before sintering. This protective tube can enjoy an extremely long life.

6 Claims, 2 Drawing Sheets

PROTECTIVE TUBE FOR THERMOCOUPLE AND METHOD OF PRODUCING SAME

BACKGROUND OF THE INVENTION

1. Field of the Invention

The present invention relates to a protective tube for a thermocouple for directly measuring the temperature of a molten metal, and a method of producing the same.

2. Description of the Embodiment

Widely used for protecting a thermocouple for directly measuring the temperature of a molten metal such as aluminum have conventionally been protective tubes consisting of cast iron tubes coated with corrosion-resistant ceramic powders. Such protective tubes, however, are prone to have their metal materials dissolved in the molten metal being measured, thus degrading the molten metal. Also, since the corrosion-resistant ceramic coatings do not have sufficient adhesion to the protective metal tubes, they should be applied every day, thus making the temperature measurement operations costly. A further disadvantage is that since they are made of metal such as cast iron, they are relatively heavy and so not easy to handle. On the other hand, as for a cast iron melt, a thermocouple is directly dipped in the melt without using a protective tube to measure its temperature quickly. In this case, however, the thermocouple is somewhat dissolved in the melt, making it impossible to conduct temperature measurement continuously for a long period of time. As an alternative method, there is a method of temperature measurement by utilizing a radiation thermometer. This method, however, fails to provide accurate temperature measurement.

Recently, protective tubes made of ceramics such as silicon nitride and silicon carbide have been replacing the metal protective tubes. These ceramic protective tubes are conventionally produced mainly by a reaction sintering method in which metal silicon is nitrided or carbonized. Therefore, they have a bending strength of no more than 30 kg/mm$^2$ or so, insufficient for withstanding mechanical stress and shock during the temperature measurement operations. In addition, these ceramic protective tubes have relative low densities so that they have rough surfaces to which a molten metal is likely to adhere. Further, even those having a relatively good bending strength do not have high resistance to heat shock so that they are vulnerable to breakage due to heat shock.

OBJECT AND SUMMARY OF THE INVENTION

An object of the present invention is, therefore, to provide a protective tube for a thermocouple for measuring the temperature of a molten metal, having a high bending strength, good corrosion resistance, a high density and a high thermal shock resistance.

Another object of the present invention is to provide a method of producing such a protective tube for a thermocouple.

As a result of intense research in view of the above objects, it has been found that an outer layer comprising BN and SiO$_2$ formed on the silicon nitride or sialon ceramic protective tube can prolong substantially the life span of a protective tube.

Thus, the protective tube for a thermocouple for measuring the temperature of a molten metal according to the present invention comprises two layers, an inner layer being made of a silicon or sialon ceramic having a bending strength of 50 kg/mm$^2$ or more, a density of 90% or more based on a theoretical density and a thermal shock temperature $\Delta T$ of 400° C. or more, and an outer layer being formed on the silicon nitride or sialon ceramic and containing BN and SiO$_2$. The silicon nitride or sialon ceramic comprises 70 weight % or more of Si$_3$N$_4$ having 65 weight % or more of an α-phase content, 20 weight % or less of one or more oxides of elements of Group IIIa of the Periodic Table, 20 weight % or less of Al$_2$O$_3$. Incidentally, this silicon nitride or sialon ceramic may further comprise 15 weight % or less of AlN or its solid solution. The outer layer is composed mainly of BN-SiO$_2$-Al$_2$O$_3$-Y$_2$O$_3$.

DETAILED DESCRIPTION OF THE INVENTION

Figure 1:
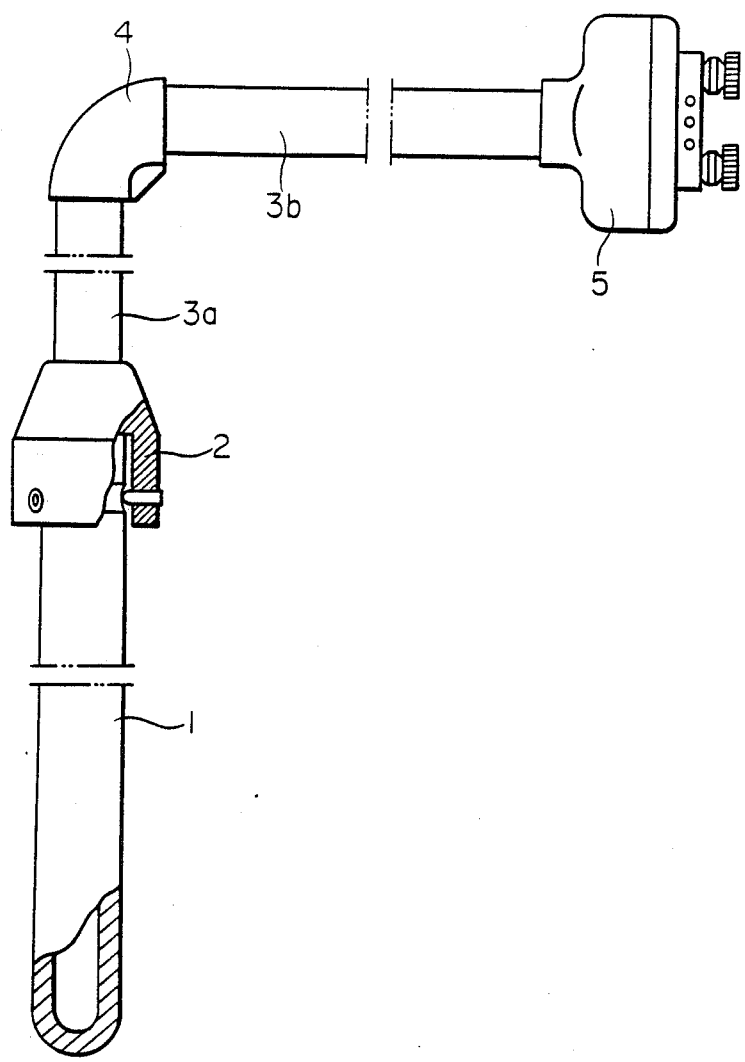
FIG. 1 is a partially cross-sectional view of the protective tube according to one embodiment of the present invention.

In FIG. 1, the protective tube 1 is connected to an extension tube 3a via an adapter 2, and the extension tube 3a is connected to another extension tube 3b via an elbow 4. The extension tube 3b is fixed to a terminal box 5. A thermocouple is inserted into the protective tube 1 through the extension tubes 3a, 3b. Only the protective tube 1 is dipped in the molten metal being measured.

According to the present invention, the silicon nitride or sialon ceramic comprises 70 weight % or more of Si$_3$N$_4$, 20 weight % or less of one or more oxides of the Group IIIa elements and 20 weight % or less of Al$_2$O$_3$.

Si$_3$N$_4$ should have 65 weight % or more of an α-phase content. When the α-phase content is less than 65 weight %, the ceramic has low sinterability, resulting in a low density of the sintered product. This in turn decreases mechanical strength greatly. Preferably, it should have 85 weight % or more of the α-phase content.

Oxides of the Group IIIa elements which may be used in the present invention include Y$_2$O$_3$, La$_2$O$_3$, CeO$_2$, etc. These oxides serve mainly as sintering aids. Y$_2$O$_3$ is the most preferable oxide, and to conduct pressureless sintering or gas pressure sintering, Y$_2$O$_3$ is preferably 5–10 weight %. When Y$_2$O$_3$ is less than 5 weight %, the resulting sintered body does not have a sufficient density, and when Y$_2$O$_3$ exceeds 10 weight %, the sintered body suffers from a remarkable decrease in high-temperature strength. Such a large amount of Y$_2$O$_3$ as above is characteristic of the pressureless sintering or the gas pressure sintering. In other words, 5–10 weight % Y$_2$O$_3$ is indispensable for these sintering methods. The more preferred amount of Y$_2$O$_3$ is 5–7 weight %.

With respect to Al$_2$O$_3$, it is preferably within the range of 3–7 weight %. When it is less than 3 weight %, the sialon is not fully sintered, leaving the density of the resulting sintered body low. On the other hand, when it exceeds 7 weight %, the resulting sintered body has an extremely low high-temperature strength. The more preferrred amount of Al$_2$O$_3$ is 3–5 weight %.

The silicon nitride or sialon ceramic according to the present invention may further contain 15 weight % or less of AlN or its solid solution. The solid solution of AlN, which may be called AlN polytype, comprises AlN, Si$_3$N$_4$ and Al$_2$O$_3$, an AlN content of which is about 68 weight %. The preferred amount of AlN or its solid solution is 1–9 weight %. When it is less than 1 weight %, the resulting sintered body has an extremely low high-temperature strength, and when it exceeds 9 weight %, it becomes difficult to achieve a sufficient degree of sintering, leaving the strength of the resulting sintered body low. The more preferable amount of AlN or AlN solid solution is 2–9 weight %.

The above ceramic powders are mixed in a ball mill using ethyl or methyl alcohol as a solvent. The resulting powder mixture is mixed with an organic binder such as polyvinyl alcohol and polyvinyl butanol in an amount of 0.5–1 weight % based on the ceramic components, and spray-dried and granulated to a desired size.

After sieving the ceramic granules to use 200–60 mesh granules, they are subjected to cold isostatic pressing (CIP) at pressure of about 700–1500 kg/cm$^2$. A green body of the protective tube produced by the CIP method is dewaxed by heating, trimmed, ground with a sand paper and cut into each desired length.

Before sintering, the green body is coated with ceramic powders comprising BN and SiO$_2$. In a preferred embodiment, BN is 40–60 weight % and SiO$_2$ is 40–60 weight %. The coating layer may be formed by spraying or brushing. For its purpose, an organic solvent such as alcohols, ethers, ketone, alkanes, aromatics, etc. is used together with an organic binder. This ceramic powder coating layer should be at least 0.5 mm in thickness to achieve sufficient effects.

The silicon nitride or sialon green body thus coated with the ceramic powders according to the present invention is sintered in a nitrogen atmosphere of 300 kg/cm$^2$ or less gas pressure. Either of pressureless sintering or gas pressure sintering may be employed.

The term "pressureless sintering" used herein means sintering under atmospheric pressure without any pressing, and the term "gas pressure sintering" used herein means sintering under gas pressure without any pressing.

The pressureless sintering is more preferable because it does not require a complicated sintering apparatus. In this sintering method, the nitrogen gas pressure is usually up to 2 kg/cm$^2$. The sintered body becomes denser with the increase in the nitrogen gas pressure.

The sintering temperature according to the present invention is 1600°–1900° C. This is because when it is less than 1600° C., the resulting sintered body does not have a satisfactory density, and when it exceeds 1900° C., Si$_3$N$_4$ may be decomposed. The preferred sintering temperature is 1700°–1800° C.

The sintered silicon nitride or sialon tube has a bending strength of 50 kg/mm$^2$ or more, a density of 90% or more and a thermal shock temperature ΔT of 400° C. or more. For the sintered product made of 80–90 weight % of Si$_3$N$_4$, 5–10 weight % of Y$_2$O$_3$, 3–7 weight % of Al$_2$O$_3$ and 2–9 weight % of AlN or AlN solid solution, the bending strength is 70 kg/mm$^2$ or more, the density is 95–99 % and the thermal shock temperature ΔT is 450° C. or more.

It has been found that sintering the silicon nitride or sialon ceramic green body coated with the ceramic powder comprising BN and SiO$_2$ provides a two-layer sintered product, an outer layer of which is composed mainly of BN-SiO$_2$-Al$_2$O$_3$-Y$_2$O$_3$. The inner layer has substantially the same composition as that of the starting ceramic powder mixture. The outer layer is as thick as 5–50 μm. Because of the presence of BN in the outer layer, the protective tube is highly resistant to adhesion of a molten metal, and has an improved oxidation resistance. The formation of this outer layer is presumably caused by a mechanism in which the presence of SiO$_2$ on the surface helps glass phases on grain boundaries move onto the surface, thus causing the sintering of BN to the surface. Al$_2$O$_3$ and Y$_2$O$_3$ which are extracted from the underlying silicon nitride or sialon layer serve to realize the sintering of BN.

Since the protective tube is composed of two layers, an inner layer being made of such silicon nitride or sialon ceramic having a high mechanical strength and thermal shock resistance, and an outer layer being composed mainly of BN-SiO$_2$-Al$_2$O$_3$-Y$_2$O$_3$ having good resistance to the adhesion of a molten metal and oxidation, it is highly resistant to an impact load and a thermal shock as well as to the adhesion of a molten metal and oxidation. In addition, it is highly resistant to corrosion. Accordingly, the protective tube of the present invention can enjoy an extremely long life.

The present invention will be explained in further detail by the following Examples.

EXAMPLE 1

85.6 weight % of Si$_3$N$_4$ powder (particle size: 0.8 μm) was mixed with 6.5 weight % of Y$_2$O$_3$ powder (particle size: 1.0 μm), 2.9 weight % of AlN polytype powder (solid solution) (particle size: 0.8 μm) and 4.8 weight % of Al$_2$O$_3$ powder (particle size: 0.1 μm) as sintering aids. The mixture was ball-milled in isopropyl alcohol. After drying, 10% of a 5-% polyvinyl alcohol solution was added to the powder mixture, and the powder mixture was charged into a rubber press for cold isostatic pressing and pressed under the isostatic pressure of 1 ton/cm$^2$ to form a green body. The green body was coated with a ceramic paste consisting of 40 parts by weight of BN powder, 40 parts by weight of SiO$_2$ powder and 50 parts by weight of collodion added with 4-methyl-2-pentanone. The resulting coating layer after drying was as thick as about 1 mm. It was then sintered in a nitrogen atmosphere at 1750° C. and 1 atm for 5 hours. After sintering, the ceramic powders remaining on the surface were removed. The resulting sintered sialon protective tube of 650 mm in length, 28 mm in outer diameter and 16 mm in thickness had the following properties:

| Relative density | 99.0% |
| --- | --- |
| Bending strength* (room temperature) | 80 kg/mm$^2$ |
| Bending strength* (1000° C.) | 80 kg/mm$^2$ |
| Thermal shock temperature ΔT | 600° C. |

Note*: 4-point bending test (upper span: 30 mm, lower span: 10 mm)

Figure 2:
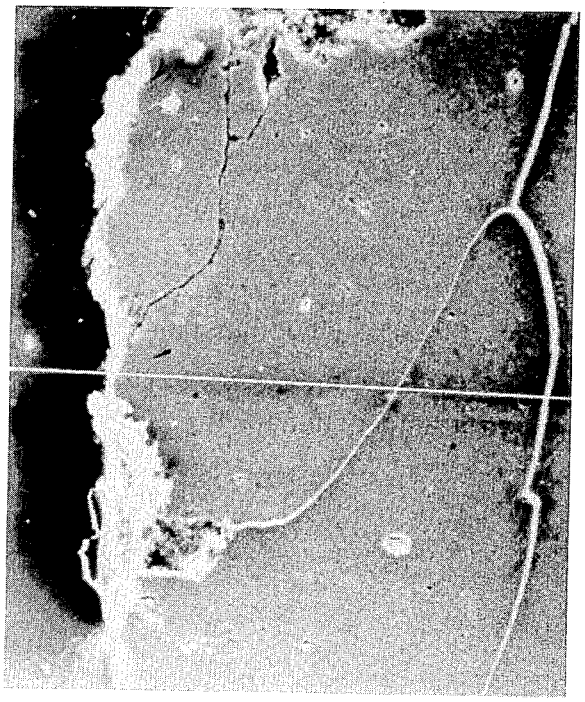
FIG. 2 is a scanning electron micrograph of a cross section of the protective tube in Example 1.

This protective tube was cut and its cross section was measured with a scanning electron microscope (SEM). FIG. 2 is a SEM photograph which clearly indicates the two-layer structure in which a gray portion is a sialon inner layer and a white portion is an outer layer. By infrared analysis, it was confirmed that BN is contained in the outer layer. Also by electron probe microanalysis (EPMA), the presence of Al and Si in the outer layer was confirmed. Since Y$_2$O$_3$ is indispensable for sintering, it is presumed for sure that the outer layer contains Y$_2$O$_3$ too, which is extracted from the underlying layer.

This protective tube was used for continuously measuring the temperature of molten aluminum. As a result, substantially no corrosion and aluminum adhesion was caused by molten aluminum, and it could withstand mechanical and thermal shocks during the temperature measurement operation for more than 12 months. Thus, it was confirmed that it can be used without any repair for more than one year.

EXAMPLE 2

Example 1 was repeated except for using 82.7 weight % of $Si_3N_4$, 5.8 weight % of $Y_2O_3$, 3.8 weight % of $Al_2O_3$ and 7.7 weight % of AlN polytype as a ceramic composition for the protective tube.

The resulting protective tube was dipped in molten gray cast iron for temperature measurement. Although the surface of the protective tube was somewhat dissolved, it could withstand temperature measurement at 1400°–1500° C. for 30 hours without suffering from breakage and cracking.

As described above, since the protective tube according to the present invention is composed of the two layers, an inner layer being made of a sintered silicon nitride ceramic or sialon, and an outer layer being composed mainly of $BN-SiO_2-Al_2O_3-Y_2O_3$, it can enjoy a long life without suffering from breakage, cracking, molten metal adhesion and corrosion. Also, since it is free from a cast iron tube, it is light and avoids the dissolution of cast iron in the molten metal, thus maintaining the quality of the molten metal.

What is claimed is:

1. A protective tube for a thermocouple for measuring the temperature of molten metal, comprising two layers, an inner layer being made of a material selected from the group consisting of silicon nitride and sialon ceramic, said inner layer having a bending strength of 50 kg/mm² or more, a density of 90% or more based on a theoretical density and a thermal shock temperature $\Delta T$ of 400° C. or more, and protective means including an outer layer being formed on said inner layer and containing BN and $SiO_2$.

2. The protective tube for a thermocouple according to claim 1, wherein said inner layer comprises 70 weight % or more of $Si_3N_4$ having 65 weight % or more of an a-phase content, 20 weight % or less of one or more oxides of elements of Group IIIa of the Periodic Table, and 20 weight % or less of $Al_2O_3$.

3. The protective tube for a thermocouple according to claim 2, wherein said outer layer is composed mainly of $BN-SiO_2-Al_2O_3-Y_2O_3$.

4. The protective tube for a thermocouple according to claim 2, wherein said inner layer further comprises 15 weight % or less of AlN or its solid solution.

5. The protective tube for a thermocouple according to claim 4, wherein said outer layer is composed mainly of $BN-SiO_2-Al_2O_3-Y_2O_3$.

6. The protective tube for a thermocouple according to claim 1, wherein said outer layer is about 5–50 μm thick.

* * * * *